Figure 1:
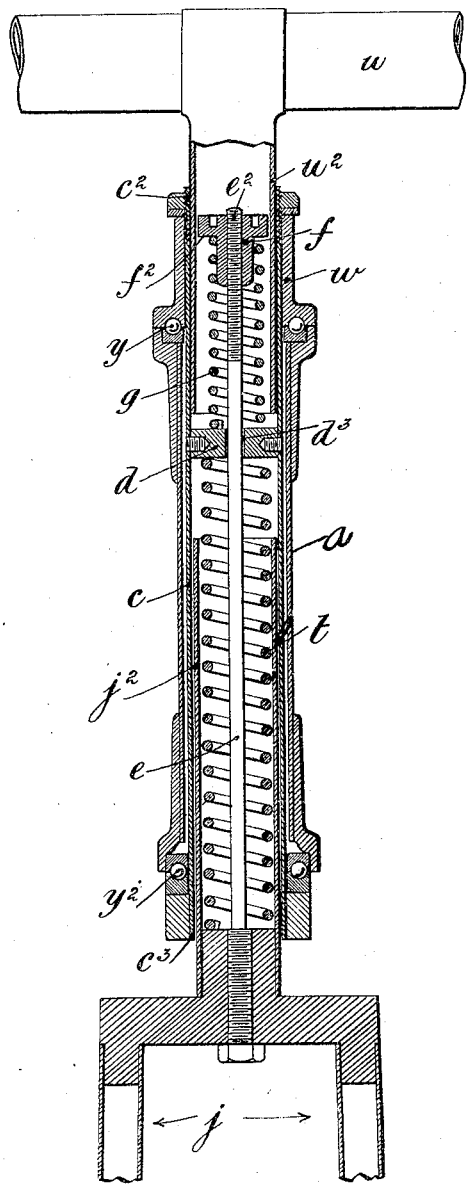

No. 783,236. PATENTED FEB. 21, 1905.
T. ASHBURN.
BICYCLE OR TRICYCLE.
APPLICATION FILED NOV. 20, 1903.

2 SHEETS—SHEET 1.

Witnesses
Inventor
Thomas Ashburn

No. 783,236. PATENTED FEB. 21, 1905.
T. ASHBURN.
BICYCLE OR TRICYCLE.
APPLICATION FILED NOV. 20, 1903.
2 SHEETS—SHEET 2.
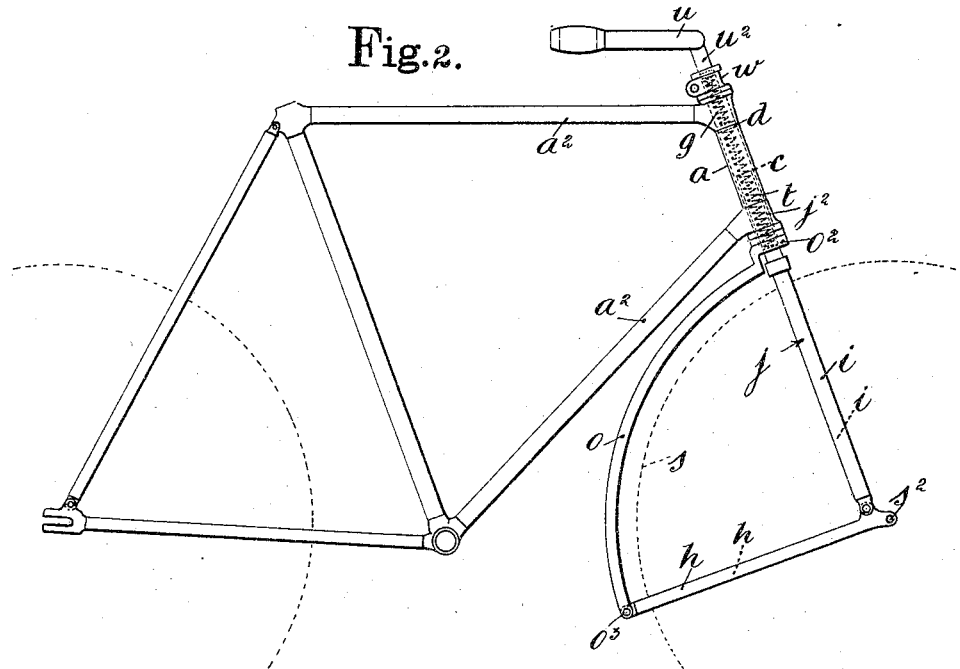
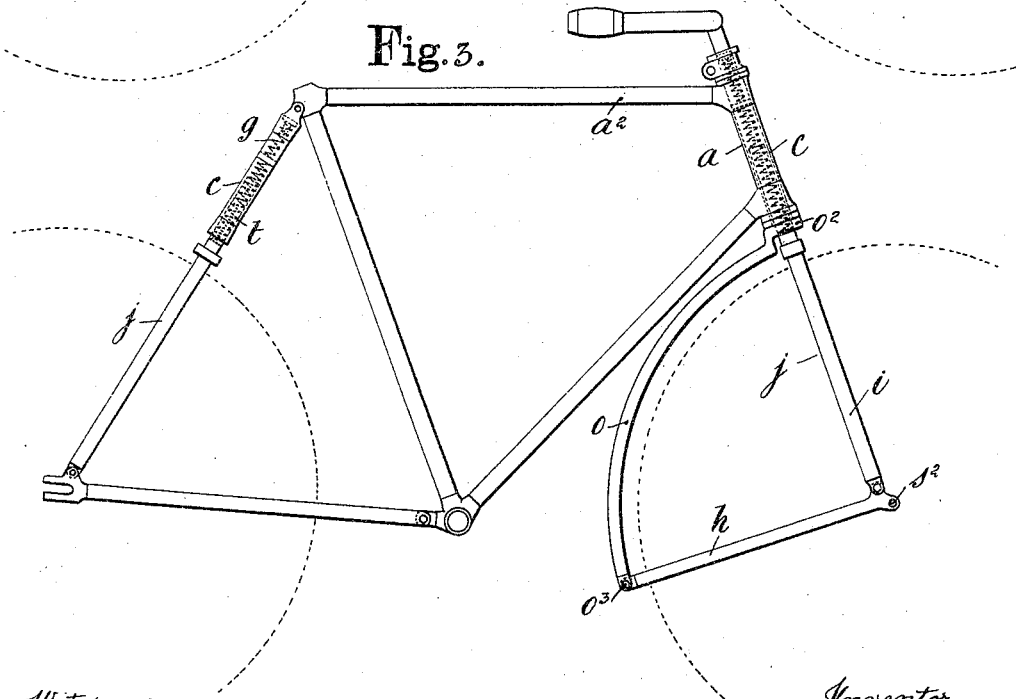

No. 783,236.                                                    Patented February 21, 1905.

UNITED STATES PATENT OFFICE.

THOMAS ASHBURN, OF LEEDS, ENGLAND.

BICYCLE OR TRICYCLE.

SPECIFICATION forming part of Letters Patent No. 783,236, dated February 21, 1905.

Application filed November 20, 1903. Serial No. 181,973.

*To all whom it may concern:*

Be it known that I, THOMAS ASHBURN, mechanical engineer, a subject of the King of Great Britain, residing at 14 Chad street, New Town, Leeds, in the county of York, England, have invented certain new and useful Improvements in Bicycles or Tricycles, of which the following is a specification.

My invention refers to a bicycle or tricycle, and comprises the improved features hereinafter described and claimed whereby in a simple and effective manner a spring-fork is provided for lessening or preventing joltings and vibrations usually felt consequent upon riding. The said spring-fork is in the application of the invention to the steering-wheel built up in combination with the steering mechanism, this being the principal application of the invention.

By the aid of the accompanying sheets of drawings the improvements will be hereinafter made clear, the same being illustrated applied to an ordinary pattern of cycle or bicycle, and particularly to the fork of the front wheel and in conjunction with the steering mechanism.

Figure 1 illustrates a vertical section through the steering-head. Fig. 2 is a side elevation of a bicycle with the front spring-fork. Fig. 3 is a side elevation of a bicycle, showing a front and back spring-fork.

With reference to Fig. 1, which is a vertical section through the steering-head of a bicycle, standing up rigidly from the crown of the fork $j$ is a tubular stem $j^2$, which when the fork is attached to the frame proper of the cycle loosely fits within a socket $c$ in the said frame and is adapted to resiliently slide up and down therein or telescope. The said socket $c$ is a tube open at both ends $c^2$ $c^3$, and in it at a suitable point a rigid transverse abutment $d$ is provided, this abutment being high up in the socket out of reach of the upper end of the tubular stem $j$. A rigidly-fitted central rod $e$, approximately the full length of the socket $c$, rises from the crown of the fork $j$ within the tubular stem $j^2$ and passes freely through a central hole $d^3$ in the abutment $d$ and has applied to it at its upper end $e^2$ a screw-cap $f$, which fits the upper end of the socket $c$ with just a circumferential clearance. The hole $d^3$ may be an angular one, the rod $e$ being angular in cross-section to fit it. Between the inner end $f^2$ of the screw-cap $f$ and the top side of the abutment $d$ is located a coiled spring $g$ in compression, and between the under side of the said abutment and the crown of the fork or an extension of the crown of the fork is located another and more powerful coiled spring $t$, also preferably in a state of compression, this last-mentioned spring lying in part within the tubular stem $j^2$, and both springs, stem $j^2$, rod $e$, and cap $f$ being concealed in the socket $c$. The two springs $g$ and $t$ can have their state of compression regulated by the turning of the screw-cap $f$ at the end of the central rod, the one spring acting against the other between the abutments and the up and down working tubular stem $j^2$ and rod $e$, it being understood that such up and down working is caused by the wheel, which is carried in the ordinary manner within the fork $j$, passing over uneven roads and that the stronger spring $t$ bears the weight of the rider from the depression of the socket $c$ and transfers it resiliently to the fork $j$, and so to the wheel carried by the said fork.

The socket $c$ aforesaid is by ball-bearings $y$ $y^2$ applied within the tubular steering-socket $a$ of the frame proper of the bicycle to turn, the said socket $a$ being stationary with the bicycle-frame. The stem $u^2$ of the handle-bar $u$ is clamped adjustably within the upper end of the tubular stem $c$ by the ordinary split lug $w$, provided for the purpose, this lug also forming part of the ball-race $y$. Longitudinally the socket $c$ is immovable from the steering-socket $a$; but it can turn or rotate independent of the said socket $a$, it constituting in reality a tubular steering-post by which the fork is turned from the handle-bar.

In action if the handle-bar $u$ is turned it, by being clamped to the socket $c$, turns or rotates the said socket within the stationary steering-socket $a$ and as a consequence turns or rotates the rod $e$ and stem $j^2$, to which is connected the fork $j$.

If the wheel of the fork $j$ traverses an uneven surface, the stem $j^2$ telescopes into the socket $c$ against the action of the spring $t$, which cushions the said telescoping and absorbs the vibration which would otherwise be imparted to the steering-socket $a$.

The features hereinbefore described are shown applied to a bicycle-frame by the diagrams Figs. 2 and 3, Fig. 2 showing a bicycle with a spring front fork only, and Fig. 3 a bicycle with front and back forks made spring-forks. In these figures the same letters of reference as on Fig. 1 are used to represent similar parts; but in addition to the features aforesaid a downwardly-extending curved member $o$, outlining the shape of the front wheel $s$, is rigidly carried at $o^2$ upon the socket $c$, this member providing at its lower end $o^3$ connection for two jointed or hinged stays $h\ h$, (the one stay is behind the other, one each side the wheel $s$,) these stays coupling the said member $o$ with the extremities of the branches $i\ i$ of the fork $j$, the said coupling being by a swinging joint in each case. The ends of the spindle $s^2$ of the wheel $s$ are attached to the stays $h\ h$. When the wheel $s$ passes over any uneven surface, the said wheel in moving up telescopes the stem $j^2$, the fork and wheel swinging up bodily from the joint $o^3$ of the part $o$.

From Figs. 2 and 3 it will be seen how the steering-socket $a$ is carried in the ordinary way from the frame proper, $a^2$, of the bicycle.

Having now described my invention, what I claim, and desire to secure by Letters Patent, is—

1. In combination, an inner sleeve forming a socket, a handle-bar provided with a hollow stem extending in said sleeve, means for adjustably clamping the stem to the sleeve, a stationary outer sleeve forming a socket surrounding said inner sleeve and having a ball-race at each end, bearing-balls supported by said clamping means and ball-races, a fork provided with a hollow stem projecting and telescoping within said inner sleeve, a rigid abutment secured within said inner sleeve, a rigid rod secured at its lower end to said fork and extending upwardly through the stem of the fork, abutment and inner sleeve, a compression-spring surrounding said rod and arranged within the inner sleeve above the abutment, a compression-spring surrounding said rod and arranged within the stem of the fork, and means mounted upon the upper end of the rod for adjusting the tension of said springs, substantially as described.

2. In combination, an inner sleeve forming a socket, a handle-bar provided with a hollow stem extending in said sleeve, means for adjustably clamping the stem to the sleeve, a stationary outer sleeve forming a socket surrounding said inner sleeve and carrying a ball-race at each end, bearing-balls supported by said clamping means and ball-races, a fork provided with a hollow stem projecting and telescoping within said inner sleeve, a rigid abutment secured within said inner sleeve, a rigid rod secured at its lower end to said fork and extending upwardly through the stem of the fork, abutment and inner sleeve, a compression-spring surrounding said rod and arranged within the inner sleeve above the abutment, a compression-spring surrounding said rod and arranged within the stem of the fork, means mounted upon the upper end of the rod for adjusting the tension of the springs, a downwardly-curved member connected at its upper end to the stationary sleeve, and a pair of hinged stays connected to the ends of the wheel-spindle and coupling the lower ends of the fork to the lower end of the member, substantially as described.

In testimony whereof I have hereunto set my hand in presence of two subscribing witnesses.

THOMAS ASHBURN.

Witnesses:
   Chas. Gilliard,
   Alfred Stanley Houghton.